United States Patent
Lambiaso

(10) Patent No.: US 6,652,313 B2
(45) Date of Patent: Nov. 25, 2003

(54) METHOD OF INSTALLING EQUIPMENT WITHOUT STRUCTURAL MODIFICATION

(75) Inventor: Guy A. Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/949,335

(22) Filed: Sep. 7, 2001

(65) Prior Publication Data

US 2003/0049963 A1 Mar. 13, 2003

(51) Int. Cl.[7] .............................................. H01R 13/52
(52) U.S. Cl. ........................................ 439/521; 248/228
(58) Field of Search .......................... 439/521; 220/3.3; 248/72, 228, 73, 223, 216, 544, 61, 59, 63, 70, 74, 74.3, 68 R, 65, 310, 68.1; 174/72 A

(56) References Cited

U.S. PATENT DOCUMENTS

| | | | |
|---|---|---|---|
| 3,917,202 A | * 11/1975 | Reinwall, Jr. et al. | ..... 248/68.1 |
| 4,135,337 A | * 1/1979 | Medlin | ........................ 220/3.3 |
| 4,223,488 A | * 9/1980 | Schoenung | .................... 52/39 |
| 4,353,519 A | 10/1982 | Bogart | |
| 5,749,194 A | 5/1998 | Andres et al. | |

FOREIGN PATENT DOCUMENTS

DE             69 33 479 U      5/1970

* cited by examiner

*Primary Examiner*—Lynn Feild
*Assistant Examiner*—J. F. Duverne
(74) *Attorney, Agent, or Firm*—Harness Dickey & Pierce P.L.C.

(57) ABSTRACT

An electrical interface panel adapted to be removably secured to one or more attachment supports which are in turn secured to a corresponding plurality of parallel extending aircraft stringers. The electrical interface panel includes groups of openings formed thereon defining a corresponding plurality of mounting points for external components to be selectively secured thereat. A pair of openings on the electrical interface panel define cover attachment points for a cover to be removably secured to the interface panel. The interface panel allows an electrical box or other closure member to be supported from two or more stringers and accommodates variations in the spacing of the stringers without having to modify the interface panel or the electrical box.

16 Claims, 3 Drawing Sheets

METHOD OF INSTALLING EQUIPMENT WITHOUT STRUCTURAL MODIFICATION

FIELD OF THE INVENTION

The present invention relates to mounting structures for use with stringers in an aircraft and more particularly to a universal interface panel adapted for interfacing with support attachments extending from stringers of a fuselage of an aircraft.

BACKGROUND OF THE INVENTION

Aircraft structural stringers are well known for having an ideal lightweight, high performance structural supporting capability. In cross section they have a central, inwardly channel-shaped portion. The channel portion has channel legs having transversely extending flanges at right angles thereto. The flanges have returning ends which form two outwardly directed channels substantially more shallow than the central inwardly opening channel. The stringers are secured to the aircraft structure through the base of the outwardly opening channel by rivets or other attaching devices.

It is necessary to secure various types of supports to the stringers for supporting cables and other materials. Conventionally, support attachments include an outwardly extending body portion including a bore for receiving cable supports or other components suitable for attachment thereto. Such configurations however, do not provide much flexibility as to where the components are mounted in relation to the support attachments.

It would therefore be highly useful to provide a mounting arrangement including a universal interface panel capable of providing a plurality of mounting locations for external components while coupled to stringers of a fuselage.

SUMMARY OF THE INVENTION

In one preferred form the present invention provides a universal electrical interface panel adapted to interface an external component to a pair of parallel extending stringers of a fuselage on an aircraft. The configuration includes a planar panel having a width sufficient to extend over at least the pair of parallel extending stringers. At least a pair of groups of openings are formed on the planar panel which define a corresponding plurality of mounting points for the external component to thereby enable the external component to be secured to the pair of stringers having different spacing distances therebetween. At least a pair of openings are arranged on the planar panel which define panel attachment points for the planar panel to thereby allow the planar panel to be secured to the pair of stringers. At least a pair of openings on the planar panel define cover attachment points for the planar panel to thereby enable a cover to be removably secured to the planar panel, wherein the cover substantially encloses the external component.

In another preferred form, a universal electrical interface panel is provided including a panel, at least one attachment location and at least one mounting location. The panel is fixedly attached to an attachment support, wherein the attachment support is adapted to attach to the aircraft stringer. At least one cover attachment location is provided wherein a cover is releasably attached to the panel and whereby the cover substantially encloses the panel. The panel further includes tabs adapted to secure electrical connector collars adapted to release strain on the electrical connectors.

In yet another form, an electrical interface plate connected to an aircraft stringer by a support attachment is provided including a panel, and at least two attachment locations. The panel is removably secured to the support attachment at least two attachment locations, wherein the support attachments are removably secured to the aircraft stringer. A plurality of electrical mounting locations and a plurality of apertures are included on the panel. A plurality of tabs are fixedly secured to the panel and protrude generally orthogonally from the panel. A cover is removably secured to the panel.

In still another preferred form, a method for attaching connections to an aircraft stringer is provided. The method includes the steps of providing an aircraft support attachment adapted to be attached to the aircraft stringer; attaching the aircraft support attachment to the aircraft stringer; providing a panel; attaching the panel to the aircraft stringer; providing a cover; securing connections on the panel; and attaching the cover to the panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
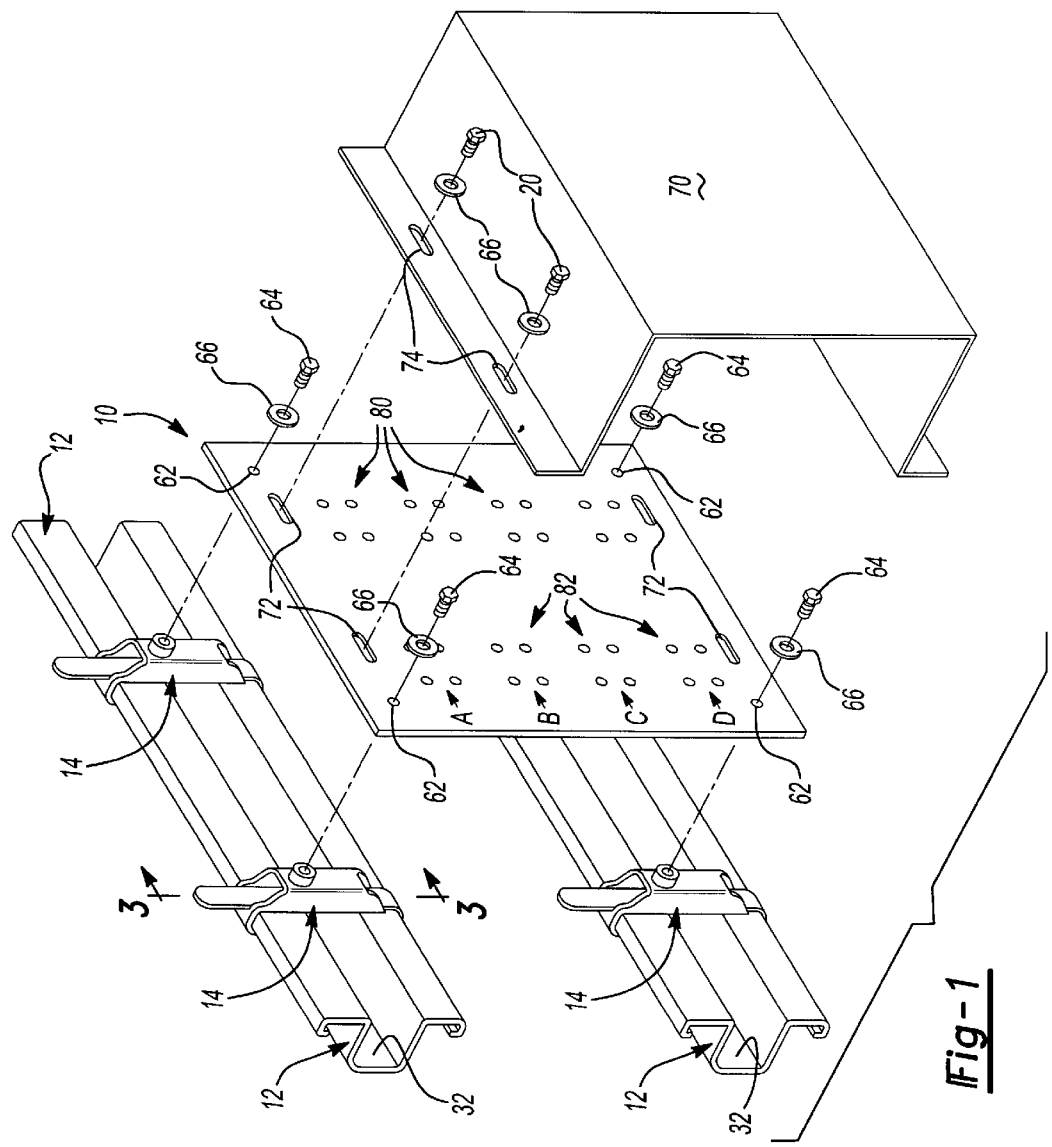
FIG. 1 is an exploded view of the stringer and electrical interface panel according to a first embodiment.

With general reference to the exploded perspective views of FIGS. 1 and 2, a universal electrical interface panel (interface panel) constructed in accordance with the teachings of the present invention will be described. With particular reference to FIG. 1, there is shown an interface panel 10 in accordance with a preferred embodiment of the present invention. The interface panel 10 is adapted to be operatively coupled to a pair of parallel extending stringers 12 by use of attachment supports 14. An electrical box is releasably coupled to interface panel 10 by conventional fasteners 20.

Figure 3:
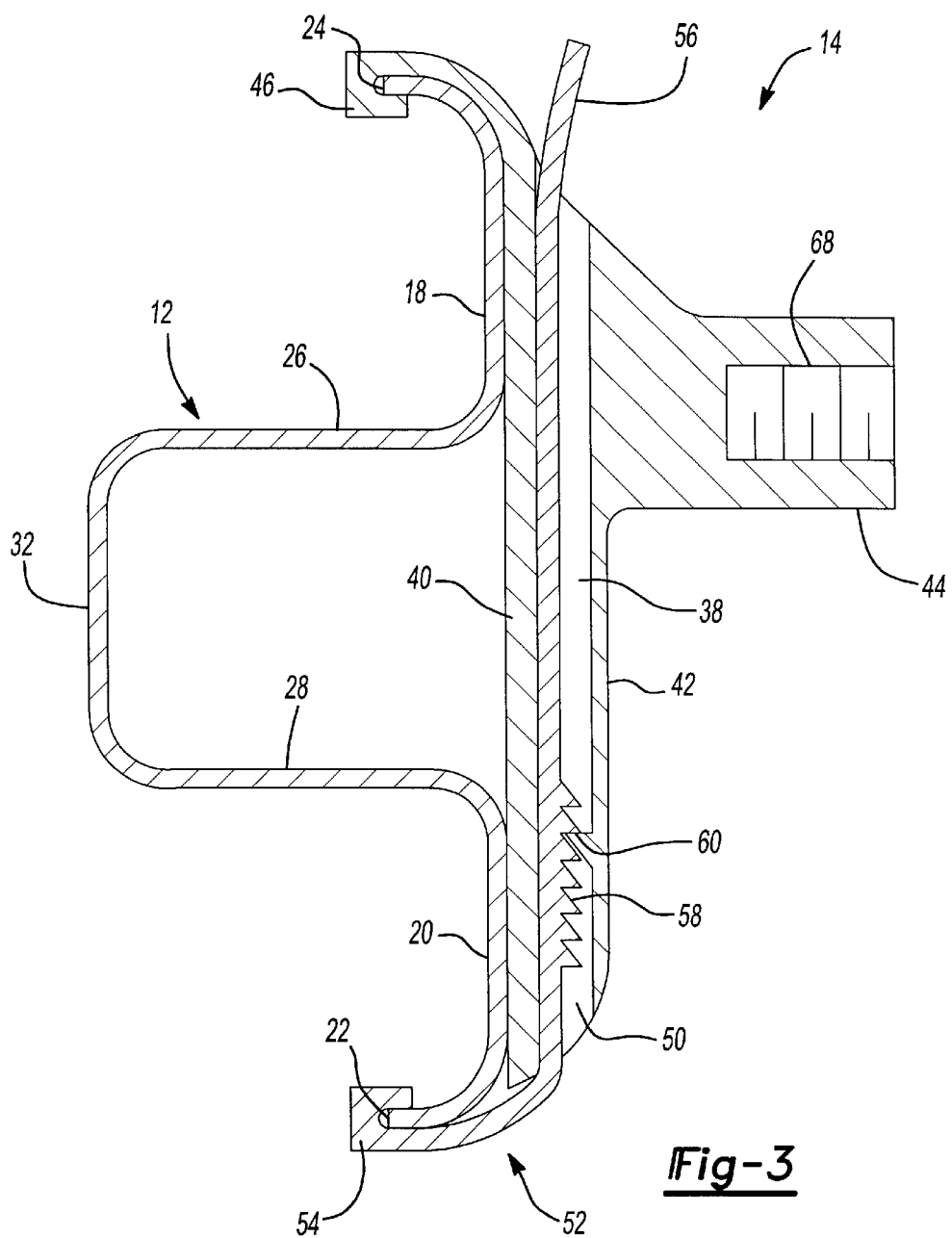
FIG. 3, is a sectional view of an attachment support taken along line 3—3 of FIG. 1.

With continued reference to FIG. 1, and additional reference to FIG. 3, the stringers 12 and attachment supports 14 used in cooperation with interface panel 10 will be described in greater detail. The stringer 12, in cross section, has an inwardly opening channel formed of a channel base 32 and channel legs 26 and 28 which cooperatively form a generally u-shaped channel. Extending transversely from the channel legs 26 and 28 are flanges 18 and 20, terminating in respective returning legs 22 and 24 to form outwardly directed shallow channels.

Stringers 12 are generally secured to an aircraft skin by rivets (not shown) through the base 32 of the stringers 12. The stringers 12, in addition to supporting the aircraft structurally along the skin, are used for internal structural support, such as of cables strung along the bulkhead adjacent the stringers. The cables, for example, are secured to the stringers by means of the conventional attachment supports 14. Such attachment supports 14 have been typically made of nylon having a central body portion 38 extending transversely along the stringer 12 when secured to one of the stringers. The body 38 has a first or outer side 40 secured in abutment with the flanges 18 and 20 and a second or inner side 42. Extending inwardly from the side 42 is a generally cylindrical portion 44 having a bore 68 therein to receive a threaded insert. The threaded insert is used to secure mounting brackets or other devices via a threaded fastener (not shown) to support materials such as cables in the direction of the stringer adjacent the skin of the aircraft.

At the right hand end of the body 38 of the attachment support 14 is a fixed hook 46 secured over the end of the outer leg 24. The body 38 has a transversely directed slot 50 extending therethrough to receive a nylon strap, generally designated at 52. The strap 52 has a hook 54 to fit over the end of the leg 22 and extends through the slot 50 so to have its end 56 extending beyond the leg 24 of the stringer 12. The strap 52 has downwardly directed ratchet teeth 58 adapted to be engaged by an upwardly extending pawl-like tooth 60. When the end 56 of the strap 52 is pulled, the hook 54 tightens on leg 22 and the ratchet teeth 58 engage the tooth 60 to tightly secure the attachment support 14 to the stringer 12.

Attachment supports 14 cannot be successfully attached by means of rivets or screws through the flanges 18 and 20 because the drilling of holes therein causes stress problems in the stringers 12.

In addition to attachment support 14, interface panel 10, is likewise configured to be operatively interconnected to stringer 12 by a support attachment as disclosed in commonly owned U.S. Pat. No. 4,353,519.

Referring now to FIG. 1, interface panel 10 will now be described in greater detail. Interface panel 10 is constructed of a rigid, lightweight material such as aluminum. Two pair of mounting apertures 62 are arranged around the corners of the interface panel 10 for receiving conventional fasteners 64. Fasteners 64 are received through washers 66, extend through mounting apertures 62 and are received in the bore 68 of cylindrical portion 44 of an associated one of the attachment supports 14. It will be appreciated by those skilled in the art that interface panel 10 may incorporate a greater or lesser plurality of mounting apertures and may be configured to be coupled to a greater or lesser plurality of attachment supports and/or stringers.

A second set of mounting apertures in the form of elongated slots 72 are provided on interface panel 10 for mounting an electrical box 70 or other form of cover thereat. Conventional fasteners 20 extend through washers 66 and apertures 74 of electrical box 70 to releasably couple electrical box 70 to the interface panel 10.

First and second groups of openings 80, 82 are arranged along interface panel 10. The groups of openings 80, 82 are configured to provide a variety of mounting points along the interface panel 10 for receiving external components such as cable stand-offs. As such, the pattern of openings 80, 82 arranged on the interface panel 10 provides a variety of mounting positions on the interface panel 10 for versatile mounting options. For example, interface panel 10 allows up to four sets of laterally offset cables (not specifically shown) to be readily attached to the interface panel 10 along the sets of openings 82 (also labeled groups A–D). One skilled in the art will recognize that a greater or lesser plurality of openings A–D may be arranged on interface panel 10, and that each set of openings need not necessarily be arranged in a square pattern.

Figure 2:
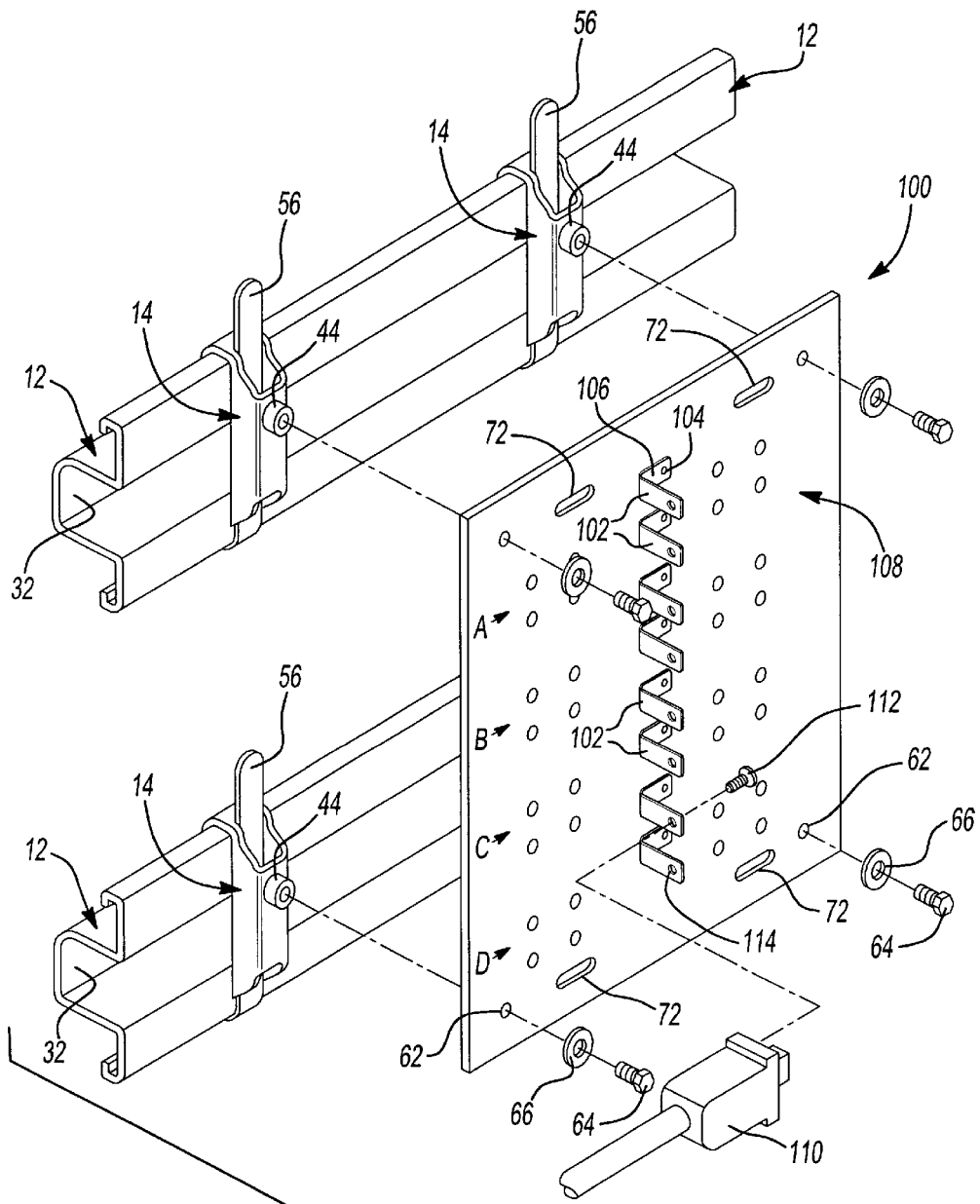
FIG. 2 is an exploded view of the stringer and electrical interface panel incorporating mounting tabs according to a second embodiment.

Turning now to FIG. 2, an interface panel 100 in accordance with an alternative preferred embodiment is shown. For clarity, common reference numerals are used to identify similar features. Interface panel 100 includes a series of mounting tabs 102 extending generally perpendicularly therefrom. Tabs 102 are constructed of a rigid lightweight material such as aluminum and are mounted to the interface panel 100 by fasteners such as rivets 104 through a foot 106 extending along a face 108 of the interface panel 100. The tabs 102 are adapted to secure electrical connector collars 110 thereat. In this manner, conventional fasteners 112 extend through apertures 114 in each tab 102 and are received within bores (not specifically shown) incorporated in the connector collars 110. The tabs 102 are incorporated to relieve strain on the electrical connections upon attachment thereto.

Interface panels 10 and 100 according to a first and second preferred embodiment provide a plurality of mounting options for a variety of external components such as electrical cables making it possible to arrange such external components in an organized configuration without adding significant manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A universal electrical interface panel adapted to interface an external component to a pair of parallel extending stringers of a fuselage of an aircraft, comprising:

a planar panel having a width sufficient to extend over at least the pair of parallel extending stringers;

at least a pair of groups of openings formed on said planar panel defining a corresponding plurality of mounting points for the external component to thereby enable the external component to be secured to the pair of stringers and to accommodate a degree of spacing variations between the stringers; and at least a pair of openings on said planar panel defining panel attachment points for the planar panel to thereby enable said planar panel to be secured to the pair of stringers through external fastening elements;

at least a pair of openings on said planar panel defining cover attachment points for the planar panel to thereby enable a cover to be removably secured to said planar panel, wherein said cover substantially encloses the external component.

2. A universal electrical interface panel as in claim 1, wherein said panel is comprised of aluminum.

3. A universal electrical interface panel as in claim 1, wherein said mounting points accept at least one cable standoff for supporting an external cable.

4. A universal electrical interface panel as in claim 1, wherein said at least one panel attachment point cooperates with at least one attachment support to couple said panel to said attachment support.

5. A universal electrical interface panel as in claim 1, wherein said cover further comprises an electrical box.

6. A universal electrical interface panel comprising;

a panel adapted to attach to a variable geometry structure;

at least one attachment location formed on said panel;

at least two mounting locations formed on said panel to thereby enable said panel to be secured to at least two structural supports;

said panel being fixedly attached to an attachment support, wherein said attachment support is adapted to attach to said at least two structural supports;

at least one cover attachment location wherein a cover is releasingly attached to said panel at said at least one cover attachment location and at least substantially encloses said panel; and wherein said cover includes tabs adapted to secure a plurality of electrical connector collars thereto, said electrical connection collars being adapted to relieve strain on the electrical connections.

7. A universal electrical interface panel as in claim 6, wherein said panel is comprised of aluminum.

8. A universal electrical interface panel as in claim 6, wherein said at least one attachment location comprises at least one cable standoff for supporting an external cable.

9. A universal electrical interface panel as in claim 6, wherein said at least one panel attachment point cooperates with at least one attachment support to couple said panel to said attachment support.

10. A universal electrical interface panel as in claim 6, further comprising an electrical box fixedly secured to said panel.

11. An electrical interface panel connected to variable geometry aircraft stringers by support attachments comprising:

a panel defining at least two attachment locations adapted to attach to said variable geometry aircraft stringers;

said panel removably secured to the support attachment at at least two attachment locations, wherein the support attachments are removably secured to at least two aircraft stringers;

a plurality of electrical mounting locations formed on said panel;

a plurality of locations on said panel defining a plurality of apertures;

a plurality of tabs fixedly secured to said panel and protruding generally orthogonally from said panel; and a cover removably secured to said panel.

12. A universal electrical interface panel as in claim 11, wherein said panel is comprised of aluminum.

13. A universal electrical interface panel as in claim 11, wherein said at least two attachment locations comprises at least one cable standoff formed on said panel.

14. A universal electrical interface panel as in claim 11, wherein said at least two attachment locations comprises at least one connector support formed on said panel.

15. A universal electrical interface panel as in claim 11, further comprising an electrical box fixedly secured to said panel.

16. A method for securing a plurality of electrical or hydraulic connections to a portion of aircraft stringers with variable geometry comprising:

providing an aircraft support attachment adapted to be attached to at least two aircraft stringers;

attaching said aircraft support attachment to the associated aircraft stringer;

providing a panel adapted to be attached to said aircraft stringers;

attaching said panel to the at least two aircraft stringers;

providing a cover configured to be attached to said panel;

securing the connections on said panel; and attaching said cover to said panel.

* * * * *